US011351678B1

(12) United States Patent
Polido et al.

(10) Patent No.: US 11,351,678 B1
(45) Date of Patent: Jun. 7, 2022

(54) DYNAMICALLY ADJUSTABLE SUCTION CUPS

(71) Applicant: Amazon Technologies, Inc., Seattle, WA (US)

(72) Inventors: Felipe De Arruda Camargo Polido, North Reading, MA (US); Noah Scott Wieckowski, Boston, MA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 171 days.

(21) Appl. No.: 16/814,910

(22) Filed: Mar. 10, 2020

(51) Int. Cl.
*B25J 15/06* (2006.01)
*B25J 9/16* (2006.01)

(52) U.S. Cl.
CPC ......... *B25J 15/0683* (2013.01); *B25J 9/1612* (2013.01); *B25J 9/1697* (2013.01); *B25J 15/0658* (2013.01)

(58) Field of Classification Search
CPC .. B25J 15/0683; B25J 15/0658; B25J 9/1612; B25J 9/1697; B25J 13/08; B66C 1/0212; B66C 1/0287; B66C 1/0293
See application file for complete search history.

(56) References Cited

U.S. PATENT DOCUMENTS

| | | | | |
|---|---|---|---|---|
| 3,558,171 A * | 1/1971 | Netsch et al. | ........ | B66C 1/0212 294/186 |
| 3,955,843 A * | 5/1976 | Ottenhues | ............. | B66C 1/0243 294/189 |
| 4,852,247 A * | 8/1989 | Hawkswell | ............ | B65G 47/91 29/740 |
| 5,542,726 A * | 8/1996 | Ozawa | ................. | B25J 15/0616 29/743 |
| 6,000,122 A * | 12/1999 | Uchida | .............. | H05K 13/0409 29/740 |
| 9,339,936 B2 * | 5/2016 | Kearney | ............... | B65H 3/0816 |
| 9,623,570 B1 * | 4/2017 | Krahn | .................... | B25J 15/008 |
| 10,221,017 B2 * | 3/2019 | Lyman | .................. | B25B 11/005 |
| 10,357,883 B1 * | 7/2019 | O'Connor | ............ | B25J 15/0683 |
| 2012/0330453 A1 * | 12/2012 | Samak Sangari | ...... | B25J 13/085 700/121 |
| 2014/0241846 A1 * | 8/2014 | Mohd Zairi | ......... | B25J 15/0683 414/752.1 |
| 2019/0217484 A1 * | 7/2019 | Takahashi | ................ | B25J 15/12 |

* cited by examiner

*Primary Examiner* — Dean J Kramer
(74) *Attorney, Agent, or Firm* — Eversheds Sutherland (US) LLP

(57) ABSTRACT

Systems, methods, and computer-readable media are disclosed for dynamically adjustable suction cups. In one embodiment, an example device may include a backplate, a gear coupled to the backplate and configured to move from a first position to a second position, a first suction cup segment having a first cavity, and a second suction cup segment disposed adjacent to the first suction cup segment, where a first portion of the second suction cup segment is disposed in the first cavity. Movement of the mechanical actuator from the first position to the second position may cause the first portion of the second suction cup segment to slide out of the first cavity, such that a surface area of a suction cup formed by the first suction cup segment and the second suction cup segment increases.

20 Claims, 8 Drawing Sheets

DYNAMICALLY ADJUSTABLE SUCTION CUPS

BACKGROUND

As users increasingly make online purchases, fulfilment of such purchases and other orders may become increasingly complicated. For example, a fulfillment center may have output of upwards of one million packages per day. With such demands, efficiency of logistics related to processing orders and packages may be important. Accordingly, improvements in various operations of order fulfillment, such as improvements to picking technology, sorting technology, packing technology, and so forth may be desired, such that manual efforts can be redirected to different tasks.

Figure 1:
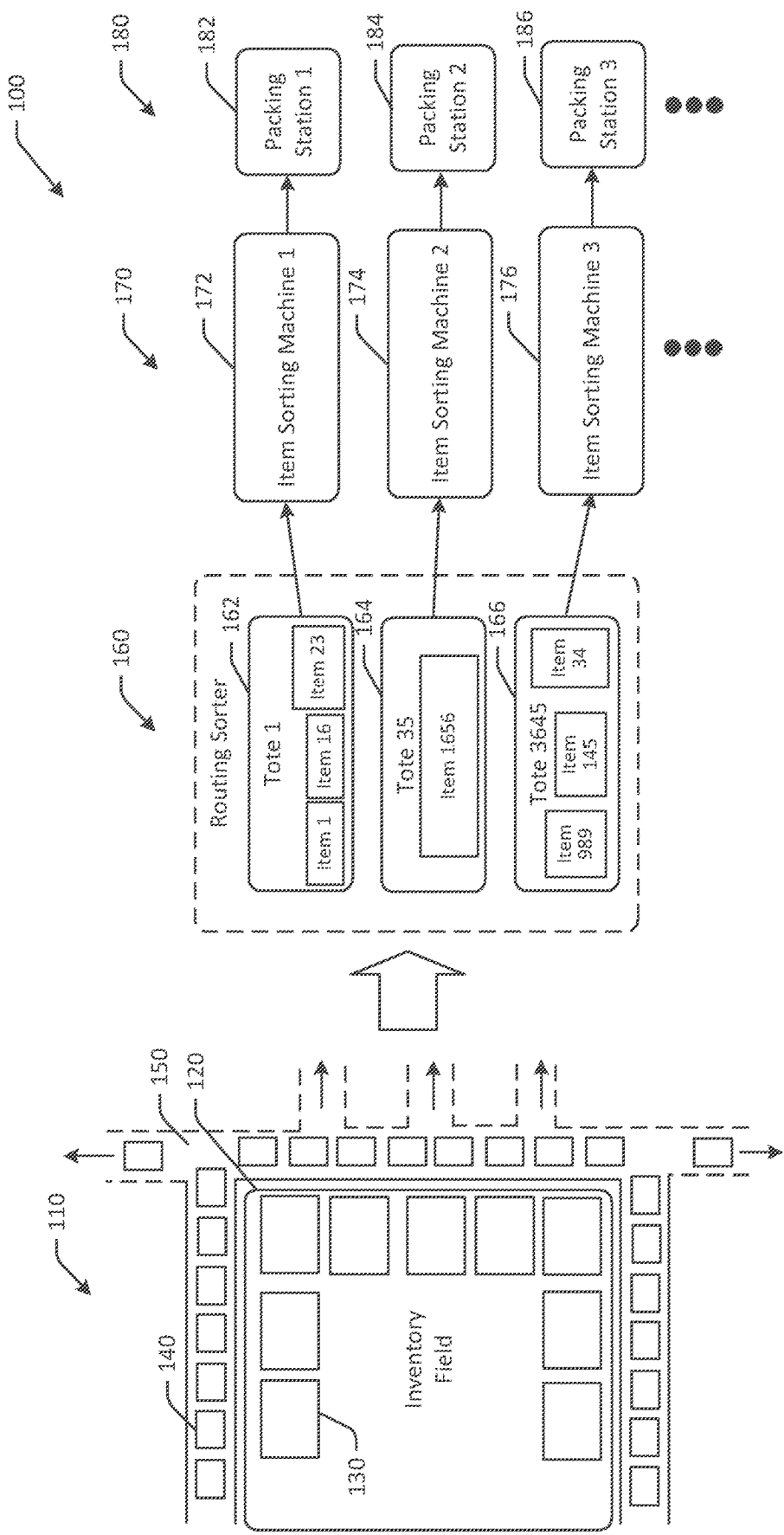
FIG. 1 is a hybrid schematic illustration of an example use case for dynamically adjustable suction cups and an example process flow in accordance with one or more embodiments of the disclosure.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. Different reference numerals may be used to identify similar components. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Fulfillment centers may be used to fulfill online purchases and other orders. For example, fulfillment centers may include product inventory that may be pulled when an order for a particular product or multiple products is placed. In some instances, the product(s) may be packed and shipped from the fulfillment center. However, the process of obtaining the product(s), packing the product(s), and shipping the product(s) may be complicated due to the amount of inventory, the number of orders to process, the size of the fulfillment center, and/or other factors. In addition, a portion of the fulfillment center designated for packing or shipping may be different than the portion of the fulfillment center designated for holding product inventory. As a result, transportation of products in an order may be time consuming.

Moving items or objects through a fulfillment center may require handling of the item itself. For example, picking the item from inventory, placing the item into a container, removing the item from a container, and so forth may all be examples of actions for which an item may need to be handled. In addition, different items may have different types of packaging. For example, some items may come in boxes, some items may come in loose bags, some items may come shrink wrapped, some items may not have any packaging, and so forth. In addition, retrieving a certain number of items, such as singular items, may be difficult depending on a type of packaging in which the item comes with, or a shape or geometry of the item itself. Humans may be able to manually handle individual items with ease. However, robotic handling of individual items may require various levels of dexterity. Potential problems include grasping certain types of objects or packaging material, grasping more than a desired number of items, an available surface area to grasp an item, and so forth.

Embodiments of the disclosure include methods and systems for automated handling of items and objects regardless of packaging that may improve processing and fulfillment of orders, or other object aggregation tasks. Certain embodiments include robotic arms or other systems (e.g., gantries, delta robots, etc.) with picking assemblies that use dynamically adjustable suction cups in conjunction with vacuum suction to pick up and/or release, or otherwise handle, objects, so as to increase throughput and speed of object handling. Some embodiments include optimized process flows for processing of orders at fulfillment centers, as well as process flows or methods to increase speed of consolidating products in a multi-item order as a result of improved speed in placing items into containers and removing items from containers. As a result, throughput of fulfillment centers may be improved, and/or logistics of fulfillment center operations may be less complicated.

Referring to FIG. 1, an example use case 100 for dynamically adjustable suction cups and an example process flow in accordance with one or more embodiments of the disclosure. Although discussed in the context of online orders, other embodiments may be directed to any suitable use case where objects are picked and released, such as instances where objects are picked from inventory, placed into containers, removed from containers for sorting, and so forth.

In FIG. 1, a fulfillment center may include an inventory field 110, a routing sorter 160, one or more item sorting machines 170, and one or more packing stations 180. The inventory field 110 may be include a storage platform, or a portion of the fulfillment center at which products picked from product inventory are placed. Robots may be used to pick products from inventory and to deliver to the robotic storage platform in some instances, while in other instances, manual labor or a combination thereof may be used to pick products. For example, dynamically adjustable suction cups may be used to pick objects from inventory containers and to place the retrieved objects into containers. The picking process at the robotic storage platform may include locating a product in an order, obtaining the product, and sending the product to a robotic storage platform, such as via a conveyor belt. In the illustrated embodiment, products at the robotic storage platform may be placed in a container, such as a tote.

The inventory field 110 may include multiple items that are in inventory. The items may be used to fulfill orders. The inventory field 110 may be a robotic field in some instances. One or more picking stations 130 may be positioned along a perimeter 120 of the inventory field 110. The picking stations 130 may be manually operated or may include robotic components, or a combination thereof. In some instances, picking of items from the inventory field 110 may be completed by robots that include dynamically adjustable suction cups, where the items are delivered to the picking stations 130 after being retrieved from the inventory field 110. Any number of picking stations 130 may be included, and the picking stations 130 may be located in a different position than that illustrated in FIG. 1.

One or more conveyors 150 may be disposed about the inventory field 110. For example, conveyors 150 may be disposed along the perimeter 120 of the inventory field 110. The conveyors 150 may run adjacent to the picking stations 130 in some embodiments. Any suitable conveyor configuration may be used. In the illustrated example, the conveyors 150 may include belts or rollers that run alongside the picking stations 130 and include one or more paths to one or more routing sorters.

The conveyors 150 may be used to transport one or more totes 140. For example, as totes 140 move along the conveyors 150, items may be moved from the picking stations 130 into respective totes 140. The totes 140 may be associated with particular item sorting machines, and may be moved using the conveyors 150 to a routing sorter 160.

The routing sorter 160 may be configured to route, divert, or otherwise guide certain totes to an item sorting machine. The routing sorter 160 may include any combination of ramps, slides, rollers, arms, guides, and/or other components to route totes to a particular item sorting machine. At the routing sorter 160, totes including products that have been picked may be routed to the appropriate or designated item sorting machine. For example, the routing sorter 160 may determine an identifier associated with the tote, and may determine an item sorting machine associated with the tote using the identifier. The routing sorter 160 may route or direct the tote to the appropriate item sorting machine.

A number of item sorting machines 170 may be coupled to the routing sorter 160. For example, a first item sorting machine 172, a second item sorting machine 174, a third item sorting machine 176, and so forth may be coupled to the routing sorter 160. The routing sorter 160 may guide totes to the item sorting machines to which they are assigned. For example, a first tote 162 may include item 1, item 16, and item 23, and may be assigned to the first item sorting machine 172. The routing sorter 160 may therefore route the first tote 162 to the first item sorting machine 172 for sortation of the respective items. A second tote 164 may include item 1656, and may be assigned to the second item sorting machine 174. The routing sorter 160 may therefore route the second tote 164 to the second item sorting machine 174 for sortation of the item. A third tote 166 may include item 989, item 145, and item 34, and may be assigned to the third item sorting machine 176. The routing sorter 160 may therefore route the third tote 166 to the third item sorting machine 176 for sortation of the respective items.

Some or all of the item sorting machines may be associated with one or more packing stations 180 that may be used to pack items into a shipment when a multi-item order is complete. For example, the first item sorting machine 172 may be coupled to a first packing station 182, the second item sorting machine 174 may be coupled to a second packing station 184, the third item sorting machine 176 may be coupled to a third packing station 186, and so forth. The item sorting machines may be configured to receive items from totes that have one or more, or multiple, items. The number of totes and/or the number of items associated with respective item sorting machines may be balanced, and multiple totes may be routed to the first item sorting machine 172 and the second item sorting machine 174 at the same time.

At any of the stages of the example fulfillment process of FIG. 1 where handling of objects is used, such as to pick items from inventory, place items in totes, remove items from totes, place items into bins, remove items from bins, place items into boxes for shipping, and so forth, dynamically adjustable suction cups as described herein may be used. As a result, manual effort can be redirected to other tasks.

Embodiments of the disclosure include dynamically adjustable suction cups. Certain embodiments may improve processing speed and/or throughput of fulfillment centers. Certain embodiments may improve performance of mechanical equipment for sortation and/or consolidation of items. While described in the context of online orders, aspects of this disclosure are more broadly applicable to other forms of object handling.

Unlike other suction-based grippers, such as two-fingered parallel grippers with suction cups, embodiments of the disclosure may provide a robust object handling system that improves functionality and flexibility with respect to the types of objects that can be handled using robotic or other mechanical equipment. Some embodiments may include different types of suction cups that can be used as end effectors or otherwise in conjunction with material handling equipment, such as robotic arms. In an example embodiment, the suction cups described herein may be used with robotic arms to grasp or otherwise secure items of different shapes, sizes, and weights with improved accuracy and speed relative to other types of robotic arm attachments. Some of the dynamically adjustable suction cups described herein may have actively controlled effective suction diameters. Effective suction diameters may be a diameter or area (e.g., square inch area for instances where the suction cup is not circular, etc.) in which vacuum pressure may be applied to a surface of an object. For example, an effective suction diameter for a suction cup having a fixed diameter of 3 inches may be 3 inches. In contrast, embodiments of the disclosure may have adjustable effective suction areas and/or diameters. As a result, the suction cups described herein may be used for more than a few applications and/or to grasp more than a few types of objects. Accordingly, capabilities and compatibility of item grasping systems that include suction cups as described herein may be improved. Some embodiments may be configured to handle objects having thousands of different sizes, weights, surfaces, textures, etc.

Moreover, embodiments may successfully grasp objects in cluttered environments, and may successfully target individual items so as to avoid multi-picks (e.g., picking up more than one item, etc.). Embodiments include a dynamically adjustable suction cup having an iris mechanism, such as that discussed with respect to FIGS. 3-5, and a dynamically adjustable suction cup having a coil mechanism, such as that discussed with respect to FIGS. 6-7. Embodiments may be configured to dynamically adjust effective suction diameter to optimally match the available surface area of a target item. For example, a camera system may be configured to identify a target item and to calculate an appropriate effective suction area. The effective suction area of the dynamically adjustable suction cup may be adjusted accordingly, and a robotic arm may guide the dynamically adjustable suction cup to the target item. Suction may be applied and the object may be grasped. In some embodiments, the suction force applied on the item may be proportional to the effective suction area, and by actively maximizing the area for any given item, the likelihood of a successful grasp may be increased. In another advantage over assemblies that include an array of suction cups, embodiments of the disclosure provide continuously adjustable effective surface areas and/or diameters, for increased granularity of control over effective suction areas. In addition, vacuum pressure inside dynamically adjustable suction cups as described herein improve suction by improving surface seal against each other, thereby reducing leakage.

Example embodiments of the disclosure provide a number of technical features or technical effects. For example, in accordance with example embodiments of the disclosure, certain embodiments of the disclosure may improve processing speed, throughput, and/or efficiency of fulfillment centers. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of the embodiments disclosed herein are also within the scope of this disclosure. The above-described embodiments and additional and/or alternative embodiments of the disclosure will be described in detail hereinafter through reference to the accompanying drawings.

Illustrative Embodiments and Use Cases

Figure 2:
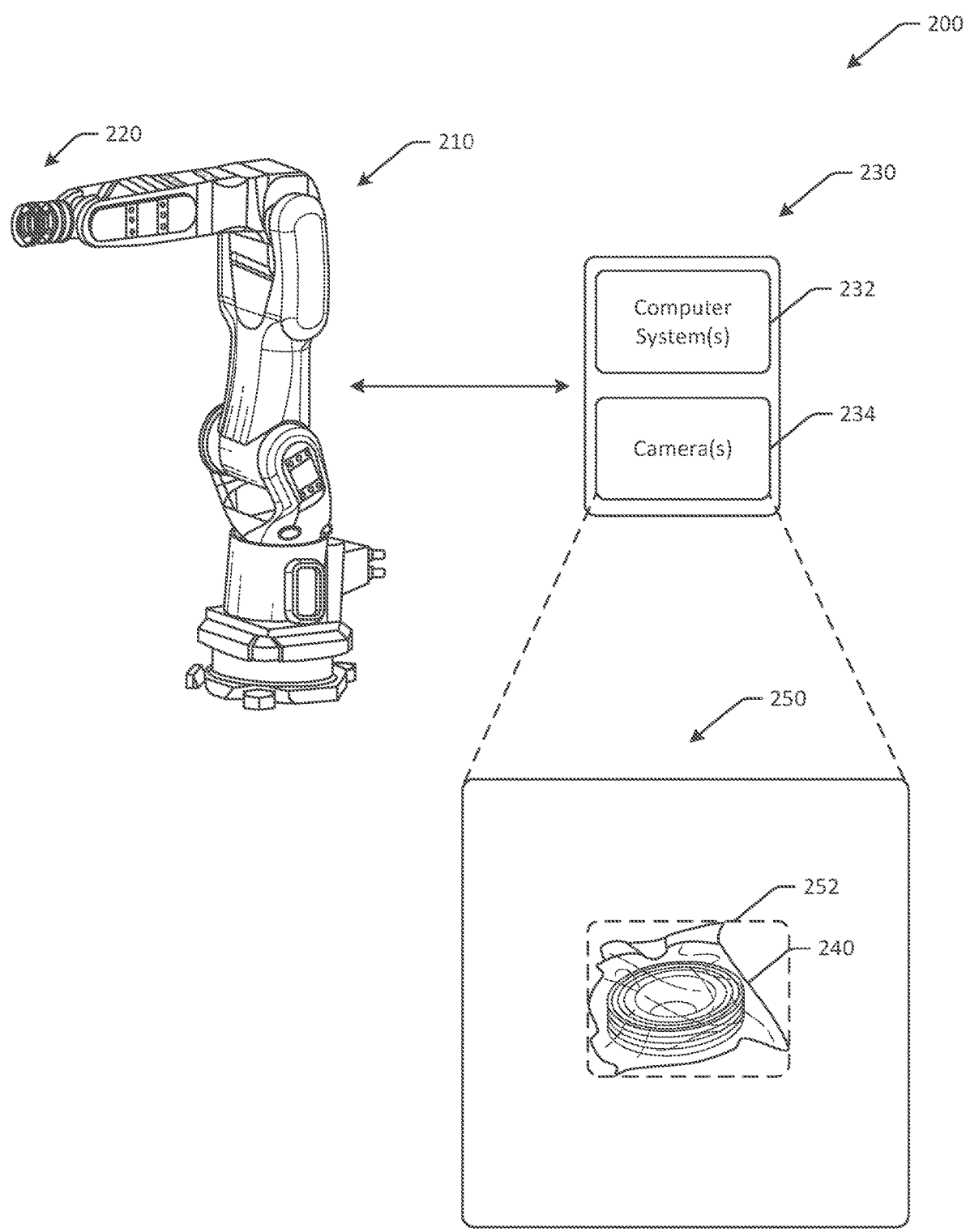
FIG. 2 is a schematic illustration of an example use case for dynamically adjustable suction cups in accordance with one or more embodiments of the disclosure.

FIG. 2 is a schematic illustration of an example use case 200 for dynamically adjustable suction cups in accordance with one or more embodiments of the disclosure. Other embodiments may include additional or fewer components. The illustration of FIG. 2 may not be to scale, and may not be illustrated to scale with respect to other figures. The end effector (e.g., robotic arm attachment, etc.) illustrated in FIG. 2 may be the dynamically adjustable suction cups discussed with respect to FIG. 1.

In FIG. 2, a robotic picking assembly 210 may be used to pick up objects of various form factors and with different packaging materials. In the illustrated example, the robotic picking assembly 210 may be coupled to a dynamically adjustable suction cup 220. The robotic picking assembly 210 may use the dynamically adjustable suction cup 220 in conjunction with a vacuum system to grasp and/or move objects. The robotic picking assembly 210 may be used to pick up a roll of tape in loose plastic bag packaging. Typically, picking up such items may be difficult due to the movement of the roll of tape (or other object in the bag) during movement, leading to a change in center of gravity, etc. for the object. In addition, alignment of a suction cup in a typical picking assembly may be critical. Unlike typical picking assemblies, robotic picking assemblies described herein may not need to be aligned with objects in any particular manner, and may pick up such objects regardless of the loose bag packaging.

The robotic picking assembly 210 may be in communication with a control system 230. The control system 230 may include one or more computer systems 232 and one or more cameras 234. The computer system 232 may be used in conjunction with the camera 234 to identify a target item to grasp using the robotic picking assembly 210, and may optionally determine an effective suction area setting for the dynamically adjustable suction cup 220. For example, the camera 234 may capture an image 250 of a roll of tape in loose packaging 240. Based at least in part on the image 250, the computer system 232 may determine a bounding box 252 or area in which the roll of tape in loose packaging 240 is located, and may determine a corresponding effective suction area. For example, depending on an amount of clutter, the effective suction area for the roll of tape in loose packaging 240 may be as large as the bounding box 252, or smaller in some instances.

Using the camera data and/or the image 250, the control system 230 may be configured to cause the robotic picking assembly 210 to position the dynamically adjustable suction cup 220 over the object. The robotic picking assembly 210 may be configured to pick up, move, and release objects, such as the roll of tape in loose packaging 240. The robotic picking assembly 210 may include a robotic arm that is used to position the dynamically adjustable suction cup 220 roughly over the object. The picking assembly may not need to be positioned in any specific location (e.g., a center, etc.) over the object.

The dynamically adjustable suction cup 220 may include a suction cup having a dynamically adjustable effective suction area, such as those discussed with respect to FIGS. 3-7. The camera 234 may therefore be a camera system configured to determine an object surface area of an object to be picked up, and the computer system 232 may be a controller configured to determine a surface area of a suction cup (e.g., the dynamically adjustable suction cup 220, etc.) based at least in part on the object surface area. The robotic picking assembly 210 may be or may include a robotic arm, and a suction cup device (e.g., the dynamically adjustable suction cup 220, etc.) that is coupled to the robotic arm and configured to pick up and release objects. A vacuum system configured to generate negative pressure to pick up an object, and positive pressure to release the object, may be coupled to the robotic picking assembly 210.

The robotic picking assembly may therefore be used to retrieve objects of different sizes, shapes, form factors, and/or having different types of packaging from one location to another without dropping or losing a grip on the object. Dynamic adjustment of the effective suction area may provide a continuously adjustable and tailored suction area for objects of different sizes for a firm and reliable grip. Although a loose bag object is illustrated in FIG. 1, any suitable object can be picked up by embodiments of the disclosure, including off-center flat objects, round objects, long narrow objects, circular objects, and so forth.

Accordingly, some embodiments may include a controller configured to cause the picking assembly to pick up an object by positioning the dynamically adjustable suction cup over an object (such as over a center, over a peripheral edge, or over another portion of the object), causing the vacuum suction device to provide negative air pressure, and causing the picking assembly to move upwards and/or in a lateral direction.

Figure 3:
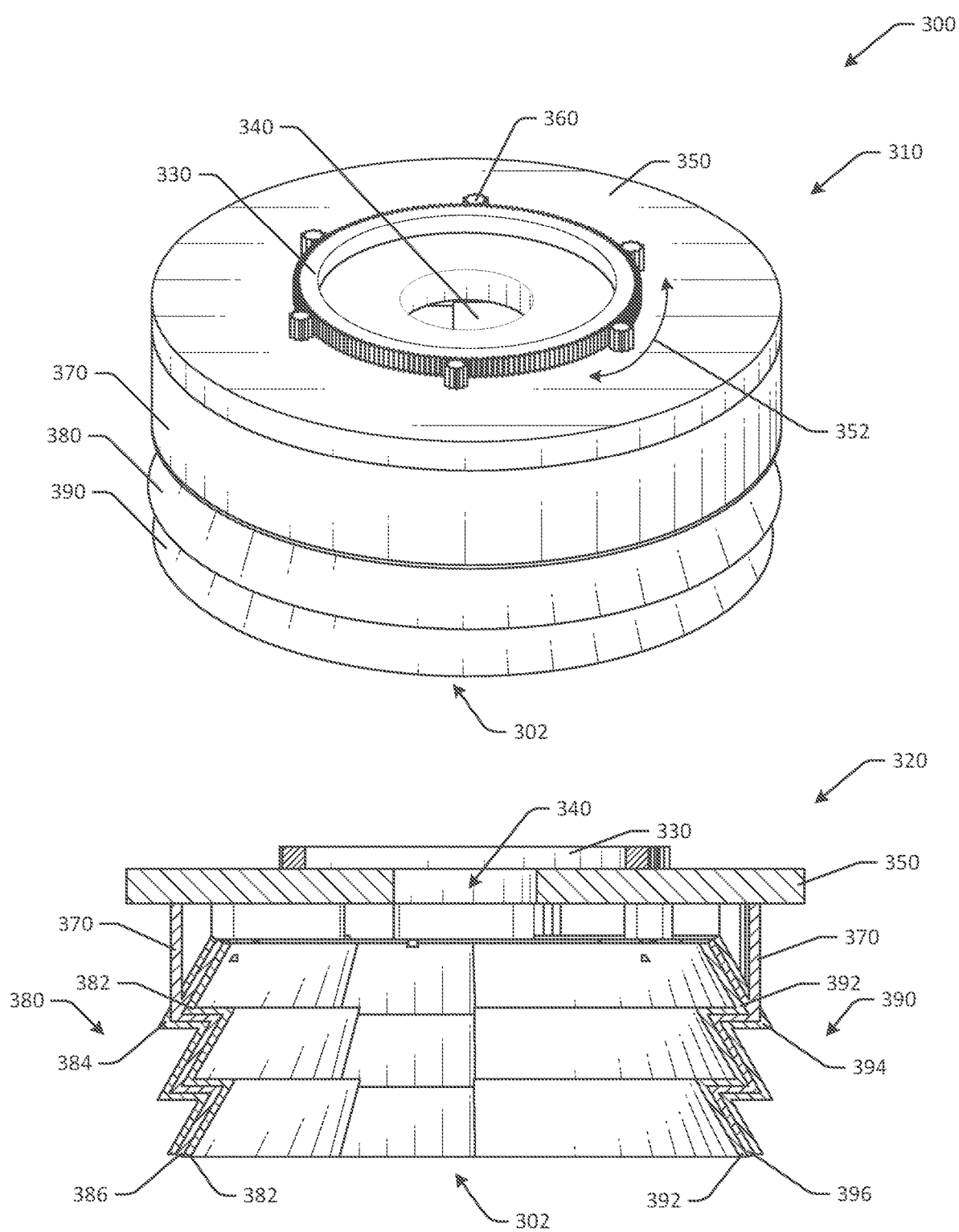
FIG. 3 is a schematic illustration of an example dynamically adjustable suction cup in various views in accordance with one or more embodiments of the disclosure.
Figure 4:
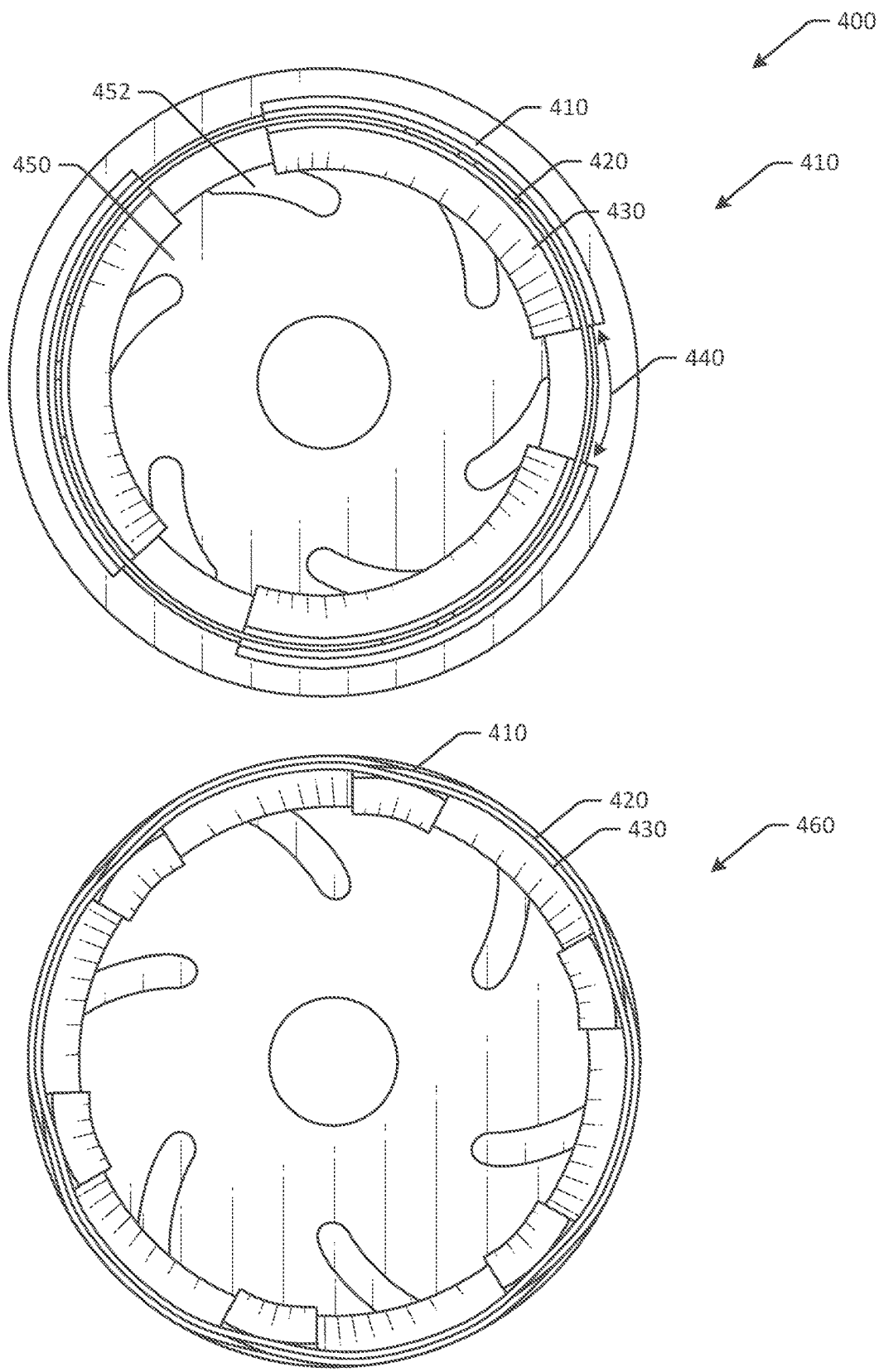
FIG. 4 is a schematic illustration of the example dynamically adjustable suction cup of FIG. 3 in a retracted state and an expanded state in accordance with one or more embodiments of the disclosure.
Figure 5:
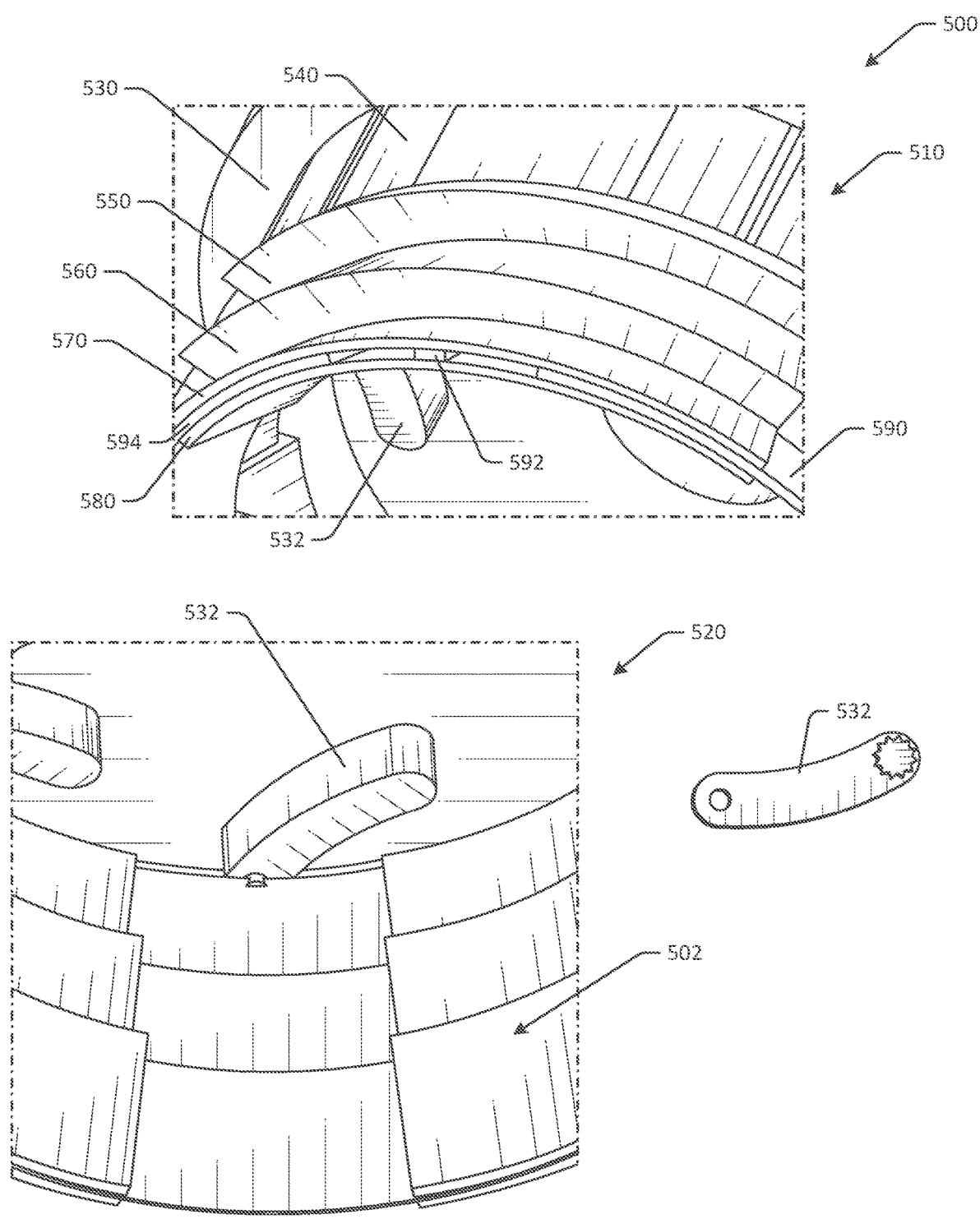
FIG. 5 is a schematic illustration of portions of an example dynamically adjustable suction cup in various detail views in accordance with one or more embodiments of the disclosure.

FIGS. 3-5 are schematic illustrations of an iris-type dynamically adjustable suction cup in various views. Although some components may be discussed using different reference numbers between the drawings, the reference numbers may refer to the same components unless otherwise described.

FIG. 3 is a schematic illustration of an example dynamically adjustable suction cup 300 in various views in accordance with one or more embodiments of the disclosure. Other embodiments may include additional or fewer components. The illustration of FIG. 3 is not to scale, and may not be illustrated to scale with respect to other figures. The dynamically adjustable suction cup illustrated in FIG. 3 may be the same dynamically adjustable suction cups discussed with respect to FIGS. 1-2.

The dynamically adjustable suction cup 300 is depicted in an expanded state in a perspective view 310 and in the expanded state in a cross-sectional view 320. The dynamically adjustable suction cup 300 may be actively driven using a ring gear coupled to a backplate 350, as depicted in FIG. 3. The mechanism may be position controlled in order to achieve repeatable effective suction areas and/or diameters. Alternating segments that form a suction cup sidewall of the dynamically adjustable suction cup 300 may have either two membranes or sidewalls and one membrane or sidewall, such that the single membrane segments can slide into and out of a cavity formed between the two membranes of the two membrane segments, resulting in a dynamically adjustable diameter of the suction cup. The suction cup segments may therefore be self-guiding. The dynamically adjustable suction cup 300 may include a wiper seal between an uppermost bellow and the backplate 350 to provide improved sealing and to prevent leakage of vacuum pressure. A vacuum aperture 340 may be disposed in the backplate 350 when a vacuum source may be coupled to provide negative and/or positive air pressure. For example, the dynamically adjustable suction cup 300 may be coupled to a vacuum system configured to generate negative pressure in an internal portion 302 to pick up an object, and positive pressure in the internal portion 302 to release the object, where the vacuum system is coupled to the opening or vacuum aperture 340 in the backplate 350.

As depicted in FIG. 3, the dynamically adjustable suction cup 300 may include the backplate 350 and a gear 330, such as a ring gear, coupled to the backplate 350. Although illustrated as an example embodiment that includes a mechanical gear, other embodiments may include different types of mechanical actuators that may not rotate, but may otherwise move to impart motion. Examples of mechanical actuators that may be used include, but are not limited to, hydraulic pistons, linear actuators, direct drive systems, valve systems, sprocket and chain systems, pulleys, individual pistons, pneumatic rotary actuators, individual electric motors per arm, and so forth.

In the example of FIG. 3, the gear 330 may be configured to rotate from a first position to a second position, and may be configured to rotate in directions 352 relative to the backplate 350. In other embodiments, the backplate 350 may be configured to rotate in directions 352 relative to the gear 330. Rotation of the gear 330, or movement of a different type of mechanical actuator, relative to the backplate 350 (or rotation of the backplate 350 relative to the gear 330) may cause a diameter of the dynamically adjustable suction cup 300 to adjust. For example, in FIG. 3, clockwise rotation of the gear 330 may cause the effective suction diameter to decrease, and counterclockwise rotation of the gear 330 may cause the effective suction diameter to increase. Motion of the gear 330 may be imparted to one or more arms disposed on an opposite side of the backplate 350 via one or more fixed gears 360 that are fixed relative to the arms, such that rotation of the gear 330 causes the arms to rotate, as illustrated in FIG. 4.

The dynamically adjustable suction cup 300 may include a suction cup having sidewalls with a number of bellows. Some embodiments may not have bellows. Bellows may provide additional compressibility in a vertical direction. Other embodiments may have more or less than the two bellows depicted in FIG. 3. In the example of FIG. 3, a wiper seal 370 may be disposed between the backplate 350 and the suction cup.

Referring to the cross-sectional view 320, the dynamically adjustable suction cup 300 may include a first suction cup segment 380 that forms a first cavity. For example, the first suction cup segment 380 may include a first sidewall 382, which may be an inner sidewall, and a second sidewall 384, which may be an outer sidewall. The cavity may be formed between the first sidewall 382 and the second sidewall 384.

A second suction cup segment 386 may be disposed adjacent to the first suction cup segment 380. A first portion of the second suction cup segment 386 may be disposed in the first cavity. For example, the second suction cup segment 386 may be a single sidewall segment, and may slide in the first cavity with respect to the first sidewall 382 and the second sidewall 384. For example, rotation of the gear 330 from the first position to the second position may cause the first portion of the second suction cup segment 386 to slide out of the first cavity, such that a surface area of a suction cup formed by the first suction cup segment 380 and the second suction cup segment 386 increases. A diameter of the dynamically adjustable suction cup may vary as the gear 330 moves from the first position to the second position. The dynamically adjustable suction cup may be compressible in a vertical direction as a result of the material of the sidewall segments (e.g., rubber, plastic, silicone, etc.), as well as the optional bellows.

Likewise, a third suction cup segment 390 may be disposed on an opposite side of the suction cup and may include a first sidewall 392 and a second sidewall 394, with a second cavity formed therebetween. A portion of a fourth suction cup segment 396 may be disposed in the second cavity, and may also slide with respect to the first sidewall 392 and the second sidewall 394, so as to provide additional flexibility and continuous motion for effective suction diameter adjustments. In an embodiment, rotation of the gear 330 from the first position to the second position may cause the second portion of the second suction cup segment 386 to slide out of the second cavity of the third suction cup segment 390, such that the surface area of the suction cup formed by the first suction cup segment 380, the second suction cup segment 386, and the third suction cup segment 390 increases. Other embodiments may have a different number of alternating double and single sidewall segments. The first suction cup segment may include a first seal (e.g., wiper seal, etc.) in contact with the backplate 350, and the second suction cup segment may include a second seal (e.g., wiper seal, etc.) in contact with the backplate 350.

In some embodiments, one or more sensors may be coupled to the suction cup and/or robotic picking assembly and used to determine whether or not a seal is present between the suction cup and the object, and, in some instances, the quality of a seal. For example, a vacuum flow leakage sensor may be used to determine a rate at which vacuum flow is leaking from the suction cup. A higher leakage rate may indicate a poor seal, and a lower leakage rate may indicate a better seal. In another example, a pressure sensor may be used to determine a pressure inside the suction cup. A higher pressure may indicate a better seal, and a lower pressure may indicate a poor seal. Some embodiments may include both sensors, or different sensors.

In some instances, sensor feedback may be used to adjust surface area or diameter of suction cups to improve sealing. For example, a diameter of a suction cup may be reduced until a vacuum flow leakage rate is below a threshold, or until a pressure measurement is above a threshold. Such dynamic adjustment may improve failure rate (e.g., accidental dropping of objects, etc.). For example, a system may include a vacuum flow sensor configured to detect vacuum flow leakage from a suction cup device, and a pressure sensor configured to detect a pressure in the suction cup device. A controller of the system may be configured to cause the suction cup device to adjust a surface area of the suction cup to a first surface area (e.g., based on camera images, etc.), and may determine that the suction cup is in contact with the object. The controller may determine a first rate of vacuum flow leakage from the suction cup using the vacuum flow sensor, and may determine a first pressure inside the suction cup using the pressure sensor. The feedback may be compared to respective thresholds to determine whether to adjust the diameter or surface area of the suction cup. If one or both thresholds are not satisfied, the controller may cause the suction cup device to reduce the surface area, and may again determine a second rate of vacuum flow leakage from the suction cup, and determine a second pressure inside the suction cup. If one or both the thresholds are satisfied, the controller may determine that the suction cup is sealed onto the object based at least in part on the second rate of vacuum flow leakage and the second pressure. The object may then be lifted and moved.

Referring to FIG. 4, FIG. 4 is a schematic illustration 400 of the example dynamically adjustable suction cup of FIG. 3 in a retracted state 410 and an expanded state 460 in accordance with one or more embodiments of the disclosure. Other embodiments may include additional or fewer components. The illustration of FIG. 4 is not to scale, and may not be illustrated to scale with respect to other figures. The dynamically adjustable suction cup illustrated in FIG. 4 may be the same dynamically adjustable suction cups discussed with respect to FIGS. 1-3.

FIG. 4 depicts the dynamically adjustable suction cup 300 in a bottom view. The dynamically adjustable suction cup may include a first suction cup segment having a first sidewall 410 and a second sidewall 420, and a second suction cup segment having a single sidewall 420 disposed between the first sidewall 410 and the second sidewall 430. As the gear of the dynamically adjustable suction cup is rotated, the respective segments that form the suction cup may rotate in either direction 440 to expand or retract.

To impart motion from the gear to the suction cup segments, one or more arms may be coupled to respective suction cup segments. The fixed gears 360 (e.g., fixed relative to the arms in some embodiments, etc.) may rotate as a result of the rotation of the gear 330, and in turn may cause one or more arms 452 to move. Movement of the arms 452 may cause the suction cup segment to which the arm is attached to move, and effect a change in the diameter of the dynamically adjustable suction cup 300. For example, a first arm (e.g., arm 452, etc.) may be coupled to the gear 330 (e.g., via fixed gear 360 or another attachment mechanism, etc.) and to the first suction cup sidewall segment. Additional arms, such as a second arm, may be coupled directly or indirectly to the gear and to the second suction cup sidewall segment. As the gear is rotated, motion may be imparted to the first suction cup segment and the second suction cup segment via the respective first arm and the second arm.

FIG. 5 is a schematic illustration 500 of portions of an example dynamically adjustable suction cup in various detail views in accordance with one or more embodiments of the disclosure. Other embodiments may include additional or fewer components. The illustration of FIG. 5 is not to scale, and may not be illustrated to scale with respect to other figures. The dynamically adjustable suction cup illustrated in FIG. 5 may be the same dynamically adjustable suction cups discussed with respect to FIGS. 1-4.

Referring to FIG. 5, an example arm 532 is depicted coupled to a suction cup sidewall segment in a close-up view 520 from an interior 502 of the dynamically adjustable suction cup.

Any number of suction cup segments and corresponding arm(s) may be included, and more than one single sidewall segment may be disposed in a cavity of a double sidewall segment. For example, the first suction cup segment as illustrated in FIG. 3 (and in a close-up view 510 in FIG. 5) may include a first sidewall 570 and a second sidewall 580. The first suction cup segment may include a first cavity and a second cavity formed between the first sidewall 570 and the second sidewall 580. The first cavity may be separated from the second cavity by a divider 592 that is disposed between the respective cavities. When the sliding segments contact the divider 592, the suction cup may be in a fully contracted or retracted state. A first single wall suction cup segment 590 may be disposed in the first cavity, and a second single wall suction cup segment 594 may be disposed in the second cavity.

The dynamically adjustable suction cup may include a backplate 530, a wiper seal 540, a first bellow 550, and a second bellow 560. For example, the first suction cup segment may include a first angled portion (e.g., first bellow 550, etc.) that is angled inward with respect to the wiper seal, and the second suction cup segment may include a second angled portion (e.g., second bellow 560, etc.) that is angled inward with respect to the wiper seal.

The first sidewall 570 may form an outer layer, and the second sidewall 580 may form an inner layer separated by the first cavity. The different segments that form the sidewalls of the suction cup may include one or more bellows, and different segments may have a different number of bellows.

Operation of the dynamically adjustable suction cup 300 may include determining an effective suction area value (e.g., based at least in part on image data captured using a camera, etc.), adjusting the diameter of the dynamically adjustable suction cup 300, moving the dynamically adjustable suction cup 300 into position, applying negative vacuum pressure to grasp the item, moving the item, and applying positive vacuum pressure to release the item.

Embodiments may be configured to dynamically adjust effective suction diameter to optimally match the available surface area of a target item. For example, a camera system may be configured to identify a target item and to calculate an appropriate effective suction area. The effective suction area of the dynamically adjustable suction cup may be adjusted accordingly, and a robotic arm may guide the dynamically adjustable suction cup to the target item. Suction may be applied and the object may be grasped. In some embodiments, the suction force applied on the item may be proportional to the effective suction area, and by actively maximizing the area for any given item, the likelihood of a successful grasp may be increased. In another advantage over assemblies that include an array of suction cups, embodiments of the disclosure provide continuously adjustable effective surface areas and/or diameters, for increased granularity of control over effective suction areas. In addition, vacuum pressure inside dynamically adjustable suction cups as described herein improve suction by improving surface seal against each other, thereby reducing leakage Although a single dynamically adjustable suction cup is illustrated in FIGS. 3-5, in some embodiments, more than one dynamically adjustable suction cup may be used in conjunction with each other to pick up objects. For example, some embodiments may include multiple dynamically adjustable suction cups arranged in an array or in a vertically offset arrangement to pick up objects. For example, the dynamically adjustable suction cup illustrated in FIG. 3 may be a first picking assembly, and the robotic picking assembly may also include a second dynamically adjustable suction cup disposed adjacent to the first dynamically adjustable suction cup, and a third picking assembly disposed adjacent to the first dynamically adjustable suction cup. The second dynamically adjustable suction cup and/or the third dynamically adjustable suction cup may be in an offset vertical position with respect to the first dynamically adjustable suction cup. Such an arrangement may improve the ability of the device to pick up objects with non-uniform surface features, such as heavy bags of cat food. In another example, the dynamically adjustable suction cup illustrated in FIG. 3 may be a first pic dynamically adjustable suction cup, and the robotic picking assembly may include a second dynamically adjustable suction cup disposed adjacent to the first dynamically adjustable suction cup, and a third dynamically adjustable suction cup disposed adjacent to the first dynamically adjustable suction cup. The second dynamically adjustable suction cup and/or the third dynamically adjustable suction cup may be arranged around the first dynamically adjustable suction cup in a concentric arrangement, a circular arrangement, an elliptical arrangement, an oval arrangement, a rectangular arrangement, and the like.

Figure 6:
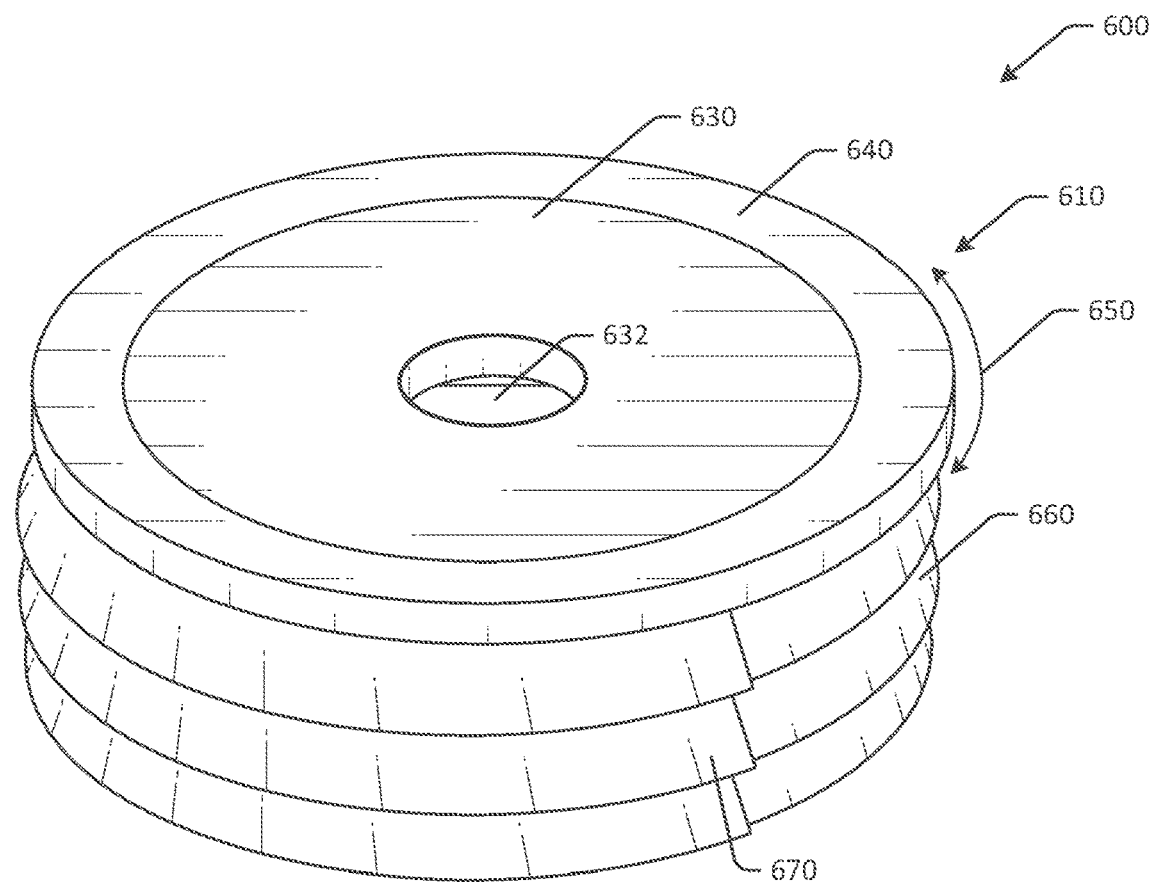
FIG. 6 is a schematic illustration of an example dynamically adjustable suction cup in various views in accordance with one or more embodiments of the disclosure.
Figure 6:
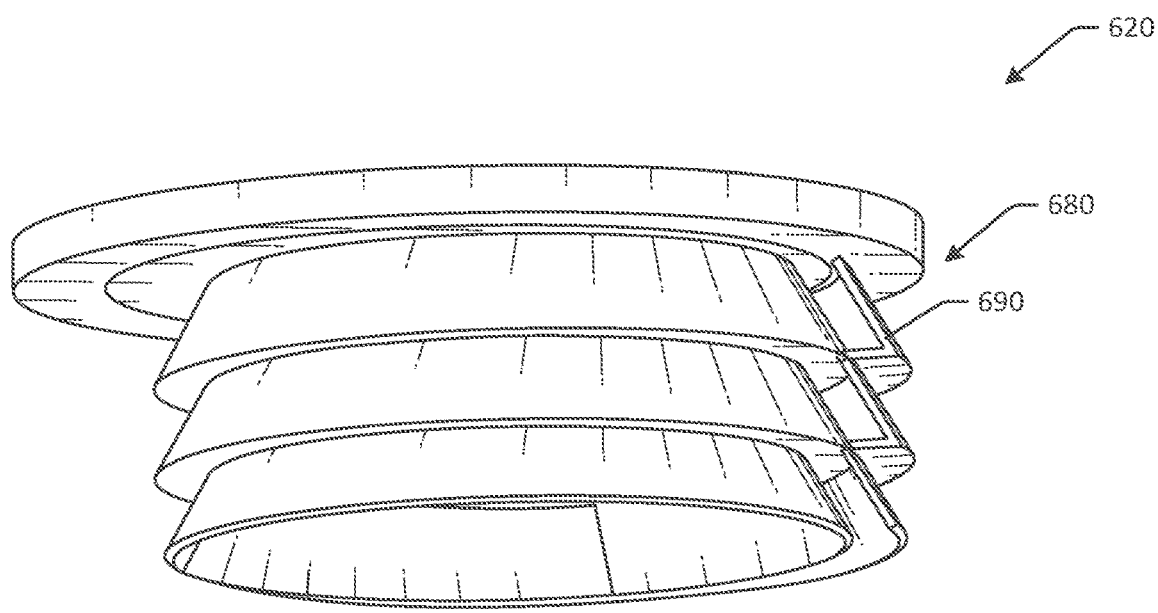
Figure 7:
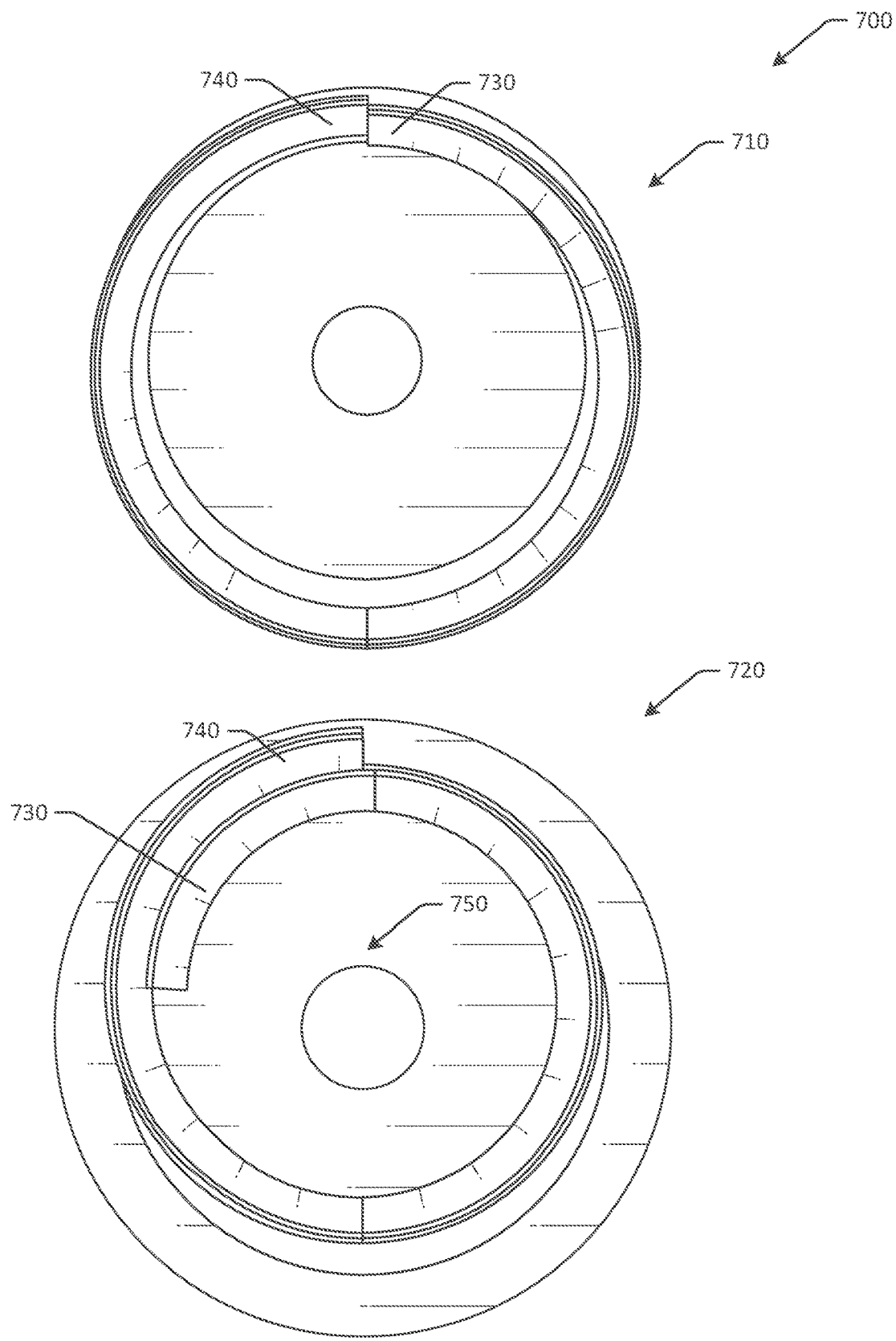
FIG. 7 is a schematic illustration of an example dynamically adjustable suction cup of FIG. 6 in an expanded state and a retracted state and in accordance with one or more embodiments of the disclosure.

FIGS. 6-7 are schematic illustrations of a coil-type dynamically adjustable suction cup in various views. Although some components may be discussed using different reference numbers between the drawings, the reference numbers may refer to the same components unless otherwise described.

FIG. 6 is a schematic illustration of an example dynamically adjustable suction cup 600 in various views in accordance with one or more embodiments of the disclosure. Other embodiments may include additional or fewer components. The illustration of FIG. 6 is not to scale, and may not be illustrated to scale with respect to other figures. The dynamically adjustable suction cup illustrated in FIG. 6 may replace the dynamically adjustable suction cups discussed with respect to FIGS. 1-5.

The dynamically adjustable suction cup 600 may be a coil-type dynamically adjustable suction cup, and is illustrated in an expanded state 610 and a retracted state 620 in FIG. 6. The dynamically adjustable suction cup 600 may operate via rotation of an outer ring 640 relative to an inner ring 630. A first end of a suction cup coil 680 may be coupled to the inner ring 630, and a second end of the suction cup coil 670 may be coupled to the outer ring 640. As a result, rotation of the outer ring 640 relative to the inner ring 630, or rotation of the inner ring 630 relative to the outer ring 640, may effect a change in diameter of the suction cup coil 660. A wiper seal 690 may be included to maintain contact between the suction cup coil 660 and the base mechanism (e.g., the inner ring 630 and the outer ring 640, etc.). Like the dynamically adjustable suction cup discussed with respect to FIGS. 3-5, the dynamically adjustable suction cup 600 may have a suction cup coil that includes one or more bellows.

In FIG. 6, referring to the dynamically adjustable suction cup 600 in the expanded state 610, the dynamically adjustable suction cup 600 may include a first gear that includes an aperture. The first gear may be the outer ring 640. The dynamically adjustable suction cup 600 may include a second gear disposed in the aperture of the first gear. The second gear may be the inner ring 630. The inner ring may include a vacuum aperture 632 that may be used to provide vacuum pressure to the suction cup coil 660. The first gear may rotate relative to the second gear and/or the second gear may rotate relative to the first gear. Accordingly, a robotic arm may modify an effective suction area or diameter of the dynamically adjustable suction cup 600 via rotation of the first gear or the second gear along either direction 650. For example, rotation in a clockwise direction in the example of FIG. 6 may cause the effective suction area to decrease, whereas rotation in a counterclockwise direction may cause the effective suction area to increase. Specifically, rotation of the first gear and/or the second gear may cause a diameter of a suction cup formed by the suction cup coil 680 to change. The dynamically adjustable suction cup 600 may include the suction cup coil 680 coupled to the first gear and/or the second gear, where the suction cup coil 680 may include a first portion and a second portion that overlaps the first portion.

FIG. 7 is a schematic illustration 700 of an example dynamically adjustable suction cup of FIG. 6 in an expanded state and a retracted state and in accordance with one or more embodiments of the disclosure. Other embodiments may include additional or fewer components. The illustration of FIG. 7 is not to scale, and may not be illustrated to scale with respect to other figures. The dynamically adjustable suction cup illustrated in FIG. 7 may be the same dynamically adjustable suction cups discussed with respect to FIG. 6.

In FIG. 7, the dynamically adjustable suction cup 600 is depicted in an expanded state 710 from a bottom view and in a retracted state 720 from a bottom view. The expanded state 710 may be a fully expanded state and the retracted state 720 may be a fully or partially retracted state. As depicted in the expanded state 710, the dynamically adjustable suction cup 600 may include a suction cup coil with a first end 740 coupled to the first gear and a second end 730 coupled to the second gear. In the expanded state 710, the first end 740 and the second end 730 may be disposed adjacent to each other.

In contrast, in the retracted state 720, as the first gear and/or second gear is rotated, the first end 740 and the second end 730 may move increasingly apart, and an amount of overlapping coil may increase. For example, as the effective surface area is reduced, the suction cup coil 680 may include a first portion and a second portion that overlaps the first portion, where the amount of overlap increases. Specifically, an amount of overlap between the first portion and the second portion increases as the diameter decreases, and the amount of overlap between the first portion and the second portion decreases as the diameter increases.

In contrast to the dynamically adjustable suction cup discussed with respect to FIGS. 3-5, as the effective suction area is reduced for the dynamically adjustable suction cup 600, a center of the suction cup (e.g., which may be a location of a vacuum aperture 750, etc.) may be increasingly offset. For example, the dynamically adjustable suction cup 600 may operate in conjunction with a vacuum system configured to generate negative pressure to pick up an object, and positive pressure to release the object. The inner ring, which may be the second gear may include an opening, such as the vacuum aperture 750, to which the vacuum system may be coupled. The vacuum aperture 750 or other opening may be offset from a center of the suction cup when the effective suction diameter or area is at a minimum diameter value.

Operation of the dynamically adjustable suction cup 600 may include determining an effective suction area value (e.g., based at least in part on image data captured using a camera, etc.), adjusting the diameter of the dynamically adjustable suction cup 600, moving the dynamically adjustable suction cup 600 into position, applying negative vacuum pressure to grasp the item, moving the item, and applying positive vacuum pressure to release the item.

Embodiments may be configured to dynamically adjust effective suction diameter to optimally match the available surface area of a target item. For example, a camera system may be configured to identify a target item and to calculate an appropriate effective suction area. The effective suction area of the dynamically adjustable suction cup may be adjusted accordingly, and a robotic arm may guide the dynamically adjustable suction cup to the target item. Suction may be applied and the object may be grasped. In some embodiments, the suction force applied on the item may be proportional to the effective suction area, and by actively maximizing the area for any given item, the likelihood of a successful grasp may be increased. In another advantage over assemblies that include an array of suction cups, embodiments of the disclosure provide continuously adjustable effective surface areas and/or diameters, for increased granularity of control over effective suction areas. In addition, vacuum pressure inside dynamically adjustable suction cups as described herein improve suction by improving surface seal against each other, thereby reducing leakage Although a single dynamically adjustable suction cup is illustrated in FIGS. 6-7, in some embodiments, more than one dynamically adjustable suction cup may be used in conjunction with each other to pick up objects. For example, some embodiments may include multiple dynamically adjustable suction cups arranged in an array or in a vertically offset arrangement to pick up objects. For example, the dynamically adjustable suction cup illustrated in FIG. 6 may be a first picking assembly, and the robotic picking assembly may also include a second dynamically adjustable suction cup disposed adjacent to the first dynamically adjustable suction cup, and a third picking assembly disposed adjacent to the first dynamically adjustable suction cup. The second dynamically adjustable suction cup and/or the third dynamically adjustable suction cup may be in an offset vertical position with respect to the first dynamically adjustable suction cup. Such an arrangement may improve the ability of the device to pick up objects with non-uniform surface features, such as heavy bags of cat food. In another example, the dynamically adjustable suction cup illustrated in FIG. 6 may be a first pic dynamically adjustable suction cup, and the robotic picking assembly may include a second dynamically adjustable suction cup disposed adjacent to the first dynamically adjustable suction cup, and a third dynamically adjustable suction cup disposed adjacent to the first dynamically adjustable suction cup. The second dynamically adjustable suction cup and/or the third dynamically adjustable suction cup may be arranged around the first dynamically adjustable suction cup in a concentric arrangement, a circular arrangement, an elliptical arrangement, an oval arrangement, a rectangular arrangement, and the like.

One or more operations of the methods, process flows, or use cases of FIGS. 1-7 may have been described above as being performed by a user device, or more specifically, by one or more program module(s), applications, or the like executing on a device. It should be appreciated, however, that any of the operations of the methods, process flows, or use cases of FIGS. 1-7 may be performed, at least in part, in a distributed manner by one or more other devices, or more specifically, by one or more program module(s), applications, or the like executing on such devices. In addition, it should be appreciated that processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-7 may be described in the context of the illustrative devices, it should be appreciated that such operations may be implemented in connection with numerous other device configurations.

The operations described and depicted in the illustrative methods, process flows, and use cases of FIGS. 1-7 may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-7 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by the execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Computer Architecture

Figure 8:
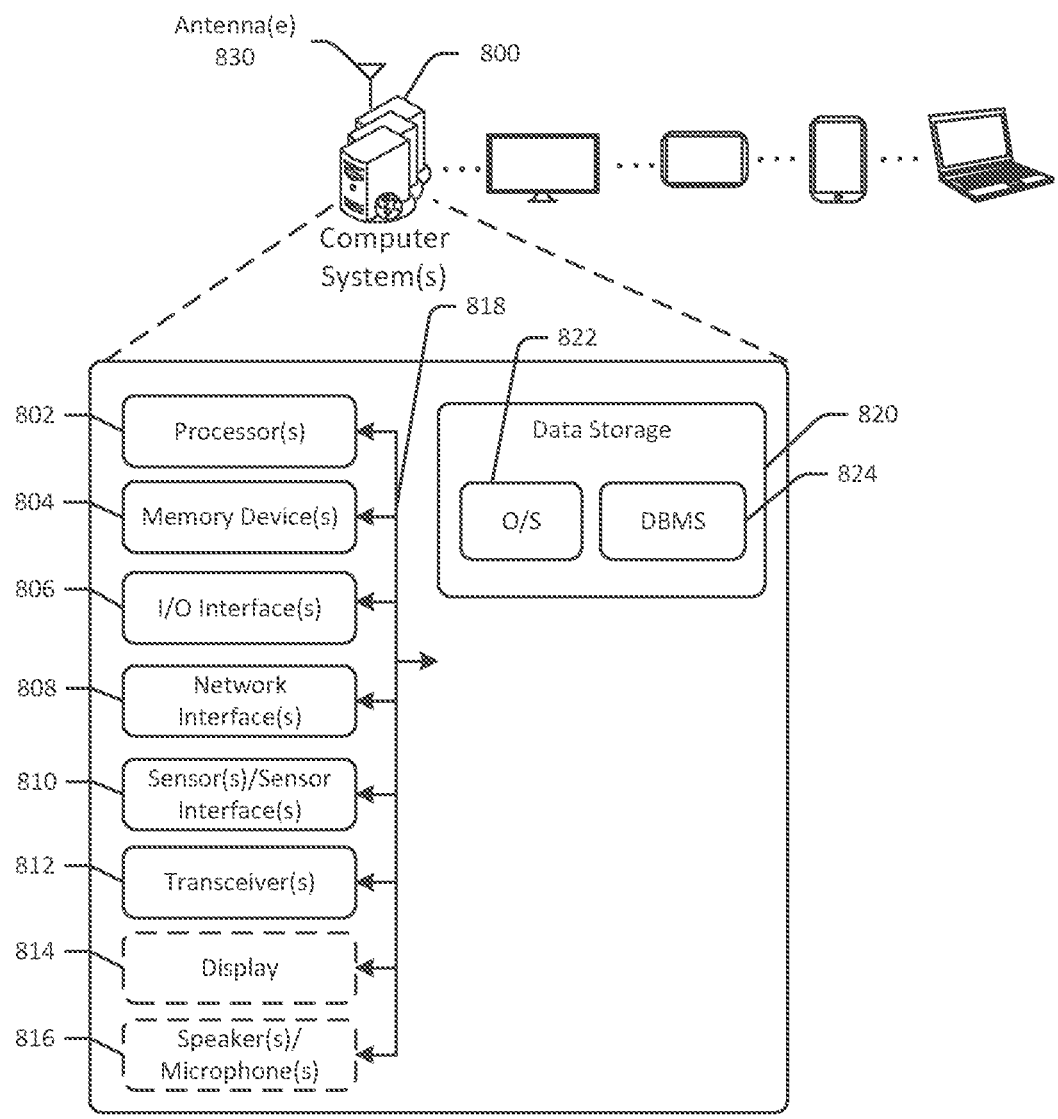
FIG. 8 schematically illustrates an example architecture of a computer system associated with an item picking system in accordance with one or more embodiments of the disclosure.

FIG. 8 is a schematic block diagram of one or more illustrative computer system(s) 800 in accordance with one or more example embodiments of the disclosure. The computer system(s) 800 may include any suitable computing device including, but not limited to, a server system, a voice interaction device, a mobile device such as a smartphone, a tablet, an e-reader, a wearable device, or the like; a desktop computer; a laptop computer; a content streaming device; or the like. The computer system(s) 800 may correspond to an illustrative device configuration for the device(s) of FIGS. 1-7. For example, the computer system(s) 800 may control one or more aspects of the dynamically adjustable suction cups and/or robotic arms described in FIGS. 1-7.

The computer system(s) 800 may be configured to communicate with one or more servers, user devices, or the like. The computer system(s) 800 may be configured to identify items, retrieve items, move items, and so forth.

The computer system(s) 800 may be configured to communicate via one or more networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the computer system(s) 800 may include one or more processors (processor(s)) 802, one or more memory devices 804 (also referred to herein as memory 804), one or more input/output (I/O) interface(s) 806, one or more network interface(s) 808, one or more sensor(s) or sensor interface(s) 810, one or more transceiver(s) 812, one or more optional display(s) 814, one or more optional microphone(s) 816, and data storage 820. The computer system(s) 800 may further include one or more bus(es) 818 that functionally couple various components of the computer system(s) 800. The computer system(s) 800 may further include one or more antenna(s) 830 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 818 may include at least one of a system bus, a memory bus, an address bus, or a message bus, and may permit the exchange of information (e.g., data (including computer-executable code), signaling, etc.) between various components of the computer system(s) 800. The bus(es) 818 may include, without limitation, a memory bus or a memory controller, a peripheral bus, an accelerated graphics port, and so forth. The bus(es) 818 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnect (PCI) architecture, a PCI-Express architecture, a Personal Computer Memory Card International Association (PCMCIA) architecture, a Universal Serial Bus (USB) architecture, and so forth.

The memory 804 of the computer system(s) 800 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 804 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 804 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 820 may include removable storage and/or non-removable storage including, but not limited to, magnetic storage, optical disk storage, and/or tape storage. The data storage 820 may provide non-volatile storage of computer-executable instructions and other data. The memory 804 and the data storage 820, removable and/or non-removable, are examples of computer-readable storage media (CRSM) as that term is used herein.

The data storage 820 may store computer-executable code, instructions, or the like that may be loadable into the memory 804 and executable by the processor(s) 802 to cause the processor(s) 802 to perform or initiate various operations. The data storage 820 may additionally store data that may be copied to the memory 804 for use by the processor(s) 802 during the execution of the computer-executable instructions. Moreover, output data generated as a result of execution of the computer-executable instructions by the processor(s) 802 may be stored initially in the memory 804, and may ultimately be copied to the data storage 820 for non-volatile storage.

More specifically, the data storage 820 may store one or more operating systems (O/S) 822; one or more database management systems (DBMS) 824; and one or more program module(s), applications, engines, computer-executable code, scripts, or the like. Some or all of these module(s) may be sub-module(s). Any of the components depicted as being stored in the data storage 820 may include any combination of software, firmware, and/or hardware. The software and/or firmware may include computer-executable code, instructions, or the like that may be loaded into the memory 804 for execution by one or more of the processor(s) 802. Any of the components depicted as being stored in the data storage 820 may support functionality described in reference to corresponding components named earlier in this disclosure.

The data storage 820 may further store various types of data utilized by the components of the computer system(s) 800. Any data stored in the data storage 820 may be loaded into the memory 804 for use by the processor(s) 802 in executing computer-executable code. In addition, any data depicted as being stored in the data storage 820 may potentially be stored in one or more datastore(s) and may be accessed via the DBMS 824 and loaded in the memory 804 for use by the processor(s) 802 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like.

The processor(s) 802 may be configured to access the memory 804 and execute the computer-executable instructions loaded therein. For example, the processor(s) 802 may be configured to execute the computer-executable instructions of the various program module(s), applications, engines, or the like of the computer system(s) 800 to cause or facilitate various operations to be performed in accordance with one or more embodiments of the disclosure. The processor(s) 802 may include any suitable processing unit capable of accepting data as input, processing the input data in accordance with stored computer-executable instructions, and generating output data. The processor(s) 802 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 802 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 802 may be capable of supporting any of a variety of instruction sets.

Referring now to other illustrative components depicted as being stored in the data storage 820, the O/S 822 may be loaded from the data storage 820 into the memory 804 and may provide an interface between other application software executing on the computer system(s) 800 and the hardware resources of the computer system(s) 800. More specifically, the O/S 822 may include a set of computer-executable instructions for managing the hardware resources of the computer system(s) 800 and for providing common services to other application programs (e.g., managing memory allocation among various application programs). In certain example embodiments, the O/S 822 may control execution of the other program module(s). The O/S 822 may include any operating system now known or which may be developed in the future including, but not limited to, any server operating system, any mainframe operating system, or any other proprietary or non-proprietary operating system.

The DBMS 824 may be loaded into the memory 804 and may support functionality for accessing, retrieving, storing, and/or manipulating data stored in the memory 804 and/or data stored in the data storage 820. The DBMS 824 may use any of a variety of database models (e.g., relational model, object model, etc.) and may support any of a variety of query languages. The DBMS 824 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the computer system(s) 800 is a mobile device, the DBMS 824 may be any suitable lightweight DBMS optimized for performance on a mobile device.

Referring now to other illustrative components of the computer system(s) 800, the input/output (I/O) interface(s) 806 may facilitate the receipt of input information by the computer system(s) 800 from one or more I/O devices as well as the output of information from the computer system(s) 800 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the computer system(s) 800 or may be separate. The I/O devices may further include, for example, any number of peripheral devices such as data storage devices, printing devices, and so forth.

The I/O interface(s) 806 may also include an interface for an external peripheral device connection such as universal serial bus (USB), FireWire, Thunderbolt, Ethernet port or other connection protocol that may connect to one or more networks. The I/O interface(s) 806 may also include a connection to one or more of the antenna(s) 830 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, a ZigBee network, etc.

The computer system(s) 800 may further include one or more network interface(s) 808 via which the computer system(s) 800 may communicate with any of a variety of other systems, platforms, networks, devices, and so forth. The network interface(s) 808 may enable communication, for example, with one or more wireless routers, one or more host servers, one or more web servers, and the like via one or more networks.

The antenna(s) 830 may include any suitable type of antenna depending, for example, on the communications protocols used to transmit or receive signals via the antenna(s) 830. Non-limiting examples of suitable antennas may include directional antennas, non-directional antennas, dipole antennas, folded dipole antennas, patch antennas, multiple-input multiple-output (MIMO) antennas, or the like. The antenna(s) 830 may be communicatively coupled to one or more transceivers 812 or radio components to which or from which signals may be transmitted or received.

As previously described, the antenna(s) 830 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(s) 830 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(s) 830 may be configured to transmit or receive radio frequency signals within any suitable frequency range forming part of the unlicensed portion of the radio spectrum.

The antenna(s) 830 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 812 may include any suitable radio component(s) for—in cooperation with the antenna(s) 830—transmitting or receiving radio frequency (RF) signals in the bandwidth and/or channels corresponding to the communications protocols utilized by the computer system(s) 800 to communicate with other devices. The transceiver(s) 812 may include hardware, software, and/or firmware for modulating, transmitting, or receiving—potentially in cooperation with any of antenna(s) 830—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 812 may further include hardware, firmware, or software for receiving GNSS signals. The transceiver(s) 812 may include any known receiver and baseband suitable for communicating via the communications protocols utilized by the computer system(s) 800. The transceiver(s) 812 may further include a low noise amplifier (LNA), additional signal amplifiers, an analog-to-digital (A/D) converter, one or more buffers, a digital baseband, or the like.

The sensor(s)/sensor interface(s) 810 may include or may be capable of interfacing with any suitable type of sensing device such as, for example, inertial sensors, force sensors, thermal sensors, photocells, and so forth. Example types of inertial sensors may include accelerometers (e.g., MEMS-based accelerometers), gyroscopes, and so forth.

The optional display(s) 814 may be configured to output light and/or render content. The optional speaker(s)/microphone(s) 816 may be any device configured to receive analog sound input or voice data.

It should be appreciated that the program module(s), applications, computer-executable instructions, code, or the like depicted in FIG. 8 as being stored in the data storage 820 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the computer system(s) 800, and/or hosted on other computing device(s) accessible via one or more networks, may be provided to support functionality provided by the program module(s), applications, or computer-executable code depicted in FIG. 8 and/or additional or alternate functionality. Further, functionality may be modularized differently such that processing described as being supported collectively by the collection of program module(s) depicted in FIG. 8 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 8 may be implemented, at least partially, in hardware and/or firmware across any number of devices.

It should further be appreciated that the computer system(s) 800 may include alternate and/or additional hardware, software, or firmware components beyond those described or depicted without departing from the scope of the disclosure. More particularly, it should be appreciated that software, firmware, or hardware components depicted as forming part of the computer system(s) 800 are merely illustrative and that some components may not be present or additional components may be provided in various embodiments. While various illustrative program module(s) have been depicted and described as software module(s) stored in the data storage 820, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

One or more operations of the methods, process flows, and use cases of FIGS. 1-7 may be performed by a device having the illustrative configuration depicted in FIG. 8, or more specifically, by one or more engines, program module(s), applications, or the like executable on such a device. It should be appreciated, however, that such operations may be implemented in connection with numerous other device configurations.

The operations described and depicted in the illustrative methods and process flows of any of FIGS. 1-7 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-7 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A robotic picking assembly comprising:
a camera system configured to determine an object surface area of an object to be picked up;
a controller configured to determine a first surface area of a suction cup based at least in part on the object surface area;
a robotic arm;
a suction cup device coupled to the robotic arm and configured to form the suction cup to pick up and release objects, the suction cup device comprising:
a backplate;
a mechanical actuator coupled to a first side of the backplate and configured to move from a first position to a second position;
a vacuum flow sensor configured to detect vacuum flow leakage from the suction cup device; and
a pressure sensor configured to detect a pressure in the suction cup device;
wherein the controller is further configured to:
cause the suction cup device to adjust a surface area of the suction cup to the first surface area;
determine that the suction cup is in contact with the object;
determine a first rate of vacuum flow leakage from the suction cup using the vacuum flow sensor;
determine a first pressure inside the suction cup using the pressure sensor;
cause the suction cup device to reduce the surface area;
determine a second rate of vacuum flow leakage from the suction cup;
determine a second pressure inside the suction cup; and
determine that the suction cup is sealed onto the object based at least in part on the second rate of vacuum flow leakage and the second pressure.

2. The robotic picking assembly of claim 1, wherein the suction cup device further comprises:
a first suction cup segment disposed on a second side of the backplate and comprising a first cavity; and
a second suction cup segment disposed adjacent to the first suction cup segment, wherein a first portion of the second suction cup segment is disposed in the first cavity;
wherein movement of the mechanical actuator from the first position to the second position causes the first portion of the second suction cup segment to slide out of the first cavity, such that the surface area of the suction cup formed by the first suction cup segment and the second suction cup segment increases.

3. The robotic picking assembly of claim 2, further comprising:
a third suction cup segment disposed adjacent to the second suction cup segment, the third suction cup segment comprising a second cavity, wherein a second portion of the second suction cup segment is disposed in the second cavity;
wherein movement of the mechanical actuator from the first position to the second position causes the second portion of the second suction cup segment to slide out of the second cavity, such that the surface area of the suction cup formed by the first suction cup segment, the second suction cup segment, and the third suction cup segment increases.

4. The robotic picking assembly of claim 2, wherein the first suction cup segment comprises an outer layer and an inner layer separated by the first cavity;
wherein the first suction cup segment comprises one or more bellows; and
wherein the second suction cup segment comprises one or more bellows.

5. A device comprising:
a backplate;
a mechanical actuator coupled to the backplate and configured to move from a first position to a second position;
a first suction cup segment comprising an outer layer, an inner layer, and a first cavity, wherein the outer layer is separated from the inner layer by the first cavity, and wherein the first suction cup segment comprises one or more bellows; and
a second suction cup segment disposed adjacent to the first suction cup segment, wherein a first portion of the second suction cup segment is disposed in the first cavity;
wherein movement of the mechanical actuator from the first position to the second position causes the first portion of the second suction cup segment to slide out of the first cavity, such that a surface area of a suction cup formed by the first suction cup segment and the second suction cup segment increases.

6. The device of claim 5, further comprising:
a first arm coupled to the mechanical actuator and to the first suction cup segment; and
a second arm coupled to the mechanical actuator and to the second suction cup segment;
wherein movement of the mechanical actuator imparts motion to the first suction cup segment and the second suction cup segment via the respective first arm and the second arm.

7. The device of claim 5, further comprising:
a third suction cup segment disposed adjacent to the second suction cup segment, the third suction cup segment comprising a second cavity, wherein a second portion of the second suction cup segment is disposed in the second cavity;

wherein movement of the mechanical actuator from the first position to the second position causes the second portion of the second suction cup segment to slide out of the second cavity, such that the surface area of the suction cup formed by the first suction cup segment, the second suction cup segment, and the third suction cup segment increases.

8. The device of claim 7, wherein the first suction cup segment further comprises a third cavity separated from the first cavity, the device further comprising:
a fourth suction cup segment disposed adjacent to the first suction cup segment, wherein a first portion of the fourth suction cup segment is disposed in the third cavity;
wherein movement of the mechanical actuator from the first position to the second position causes the first portion of the fourth suction cup segment to slide out of the third cavity, such that the surface area of the suction cup formed by the first suction cup segment, the second suction cup segment, the third suction cup segment, and the fourth suction cup segment increases.

9. The device of claim 5, wherein the second suction cup segment comprises one or more bellows.

10. The device of claim 5, wherein a diameter of the suction cup varies as the mechanical actuator moves from the first position to the second position.

11. The device of claim 5, wherein the suction cup is compressible in a vertical direction.

12. The device of claim 5, wherein the first suction cup segment further comprises a first seal in contact with the backplate, and the second suction cup segment comprises a second seal in contact with the backplate.

13. The device of claim 12, wherein the first suction cup segment further comprises a first angled portion that is angled inward with respect to the first seal, and the second suction cup segment further comprises a second angled portion that is angled inward with respect to the second seal.

14. The device of claim 5, further comprising:
a camera system configured to determine an object surface area;
a controller configured to determine the surface area of the suction cup based at least in part on the object surface area; and
a robotic picking assembly coupled to the device and configured to move the device from a first location to a second location.

15. The device of claim 5, further comprising:
a vacuum system configured to generate negative pressure to pick up an object, and positive pressure to release the object;
wherein the backplate further comprises an opening, and wherein the vacuum system is coupled to the opening.

16. A device comprising:
a first gear comprising an aperture;
a second gear disposed in the aperture; and
a suction cup coil coupled to the first gear, the suction cup coil comprising a first portion and a second portion that overlaps the first portion;
wherein rotation of the first gear or the second gear causes a diameter of a suction cup formed by the suction cup coil to change.

17. The device of claim 16, further comprising:
a vacuum system configured to generate negative pressure to pick up an object, and positive pressure to release the object;
wherein the second gear comprises an opening, and wherein the vacuum system is coupled to the opening; and
wherein the opening is offset from a center of the suction cup when the diameter is at a minimum diameter value.

18. The device of claim 16, wherein an amount of overlap between the first portion and the second portion increases as the diameter decreases, and wherein the amount of overlap between the first portion and the second portion decreases as the diameter increases.

19. The device of claim 16, wherein the suction cup coil comprises one or more bellows.

20. The device of claim 16, further comprising:
a camera system configured to determine an object surface area;
a controller configured to determine the diameter of the suction cup based at least in part on the object surface area; and
a robotic arm coupled to the device and configured to move the device from a first location to a second location.

* * * * *